(12) United States Patent
Ahling

(10) Patent No.: US 8,810,758 B2
(45) Date of Patent: Aug. 19, 2014

(54) DUAL-FUNCTION ALIGNMENT LAYER FOR LIQUID CRYSTAL DEVICES TO IMPROVE DEGRADATION RESISTANCE TO RADIATION

(76) Inventor: Jay Ahling, Firestone, CO (US)

(*) Notice: Subject to any disclaimer, the term of this patent is extended or adjusted under 35 U.S.C. 154(b) by 777 days.

(21) Appl. No.: 12/730,761

(22) Filed: Mar. 24, 2010

(65) Prior Publication Data
US 2010/0245954 A1 Sep. 30, 2010

Related U.S. Application Data

(60) Provisional application No. 61/162,856, filed on Mar. 24, 2009.

(51) Int. Cl.
*G02F 1/1337* (2006.01)
*G02F 1/1343* (2006.01)

(52) U.S. Cl.
CPC ........ *G02F 1/133784* (2013.01); *G02F 1/1343* (2013.01)
USPC ............................. 349/123; 349/126; 349/139

(58) Field of Classification Search
CPC ... F21V 8/00; G02F 1/1335; G02F 1/133784; G02F 1/1343
USPC .......................................... 349/123, 126, 139
See application file for complete search history.

(56) References Cited

U.S. PATENT DOCUMENTS

| | | | |
|---|---|---|---|
| 3,749,474 A * | 7/1973 | Cartmell ....................... 349/132 |
| 5,105,291 A * | 4/1992 | Matsumoto et al. .......... 349/139 |
| 6,275,277 B1 | 8/2001 | Walker et al. |
| 7,023,600 B2 * | 4/2006 | Mallya et al. ................. 359/238 |
| 7,184,109 B2 | 2/2007 | Hoke et al. |
| 2002/0113753 A1* | 8/2002 | Sullivan et al. ................... 345/6 |
| 2004/0227882 A1* | 11/2004 | Ham ............................. 349/124 |
| 2005/0062410 A1* | 3/2005 | Bell et al. ....................... 313/506 |
| 2006/0209241 A1 | 9/2006 | Chien et al. |

* cited by examiner

*Primary Examiner* — Lucy Chien

(57) ABSTRACT

A liquid crystal alignment layer both offers a surface to which the liquid crystal molecules align, and maintains conductive properties required for the liquid crystal molecules to be manipulated by an applied electrical field. Advantages of the alignment layer offer reduced device degradation and improved stability under conventional or high intensity radiation, and also simplify the liquid crystal display or device construction.

10 Claims, 6 Drawing Sheets

DUAL-FUNCTION ALIGNMENT LAYER FOR LIQUID CRYSTAL DEVICES TO IMPROVE DEGRADATION RESISTANCE TO RADIATION

RELATED APPLICATIONS

This application claim priority to U.S. Patent Application Ser. No. 61/162,856, filed Mar. 24, 2009, and incorporated herein by reference.

TECHNICAL FIELD OF THE INVENTION

This invention relates to liquid crystal devices and their ability to resist degradation from high intensity and prolonged exposure to radiation. In particular, this invention relates to a combined alignment layer and thin film electrode that aligns liquid crystals within the device.

BACKGROUND

Liquid crystal devices have a wide range of applications. Their most well known use is information display devices called Liquid Crystal Displays (LCDs). LCDs display information in the form of simple alphanumeric characters through to complex streaming video. Common examples of these LCDs are found in digital watches, digital gas pumps, personal digital assistants (PDAs), laptop computer screens, and televisions. There are many other types of applications in which liquid crystal devices are used, such as: near-to-the-eye Head Mount Displays systems, projection systems, imaging systems, mastering and data storage systems, optical systems as shutters or light guides, variable retarders, variable attenuators, polarization rotators, spatial light modulators, beam steering devices, and filters.

In all of these applications that use liquid crystal devices, radiation is a common factor for user interface functionality. Some form of electromagnetic radiation (usually light) is being passed, blocked, or manipulated by a liquid crystal device. In certain applications, the electromagnetic radiation is far more intense and at wavelengths that have not typically been used in past applications. This higher intensity radiation, over a broader wavelength range or at a single wavelength, degrades materials comprising the liquid crystal device; most notably the alignment layer is significantly affected.

Figure 1:
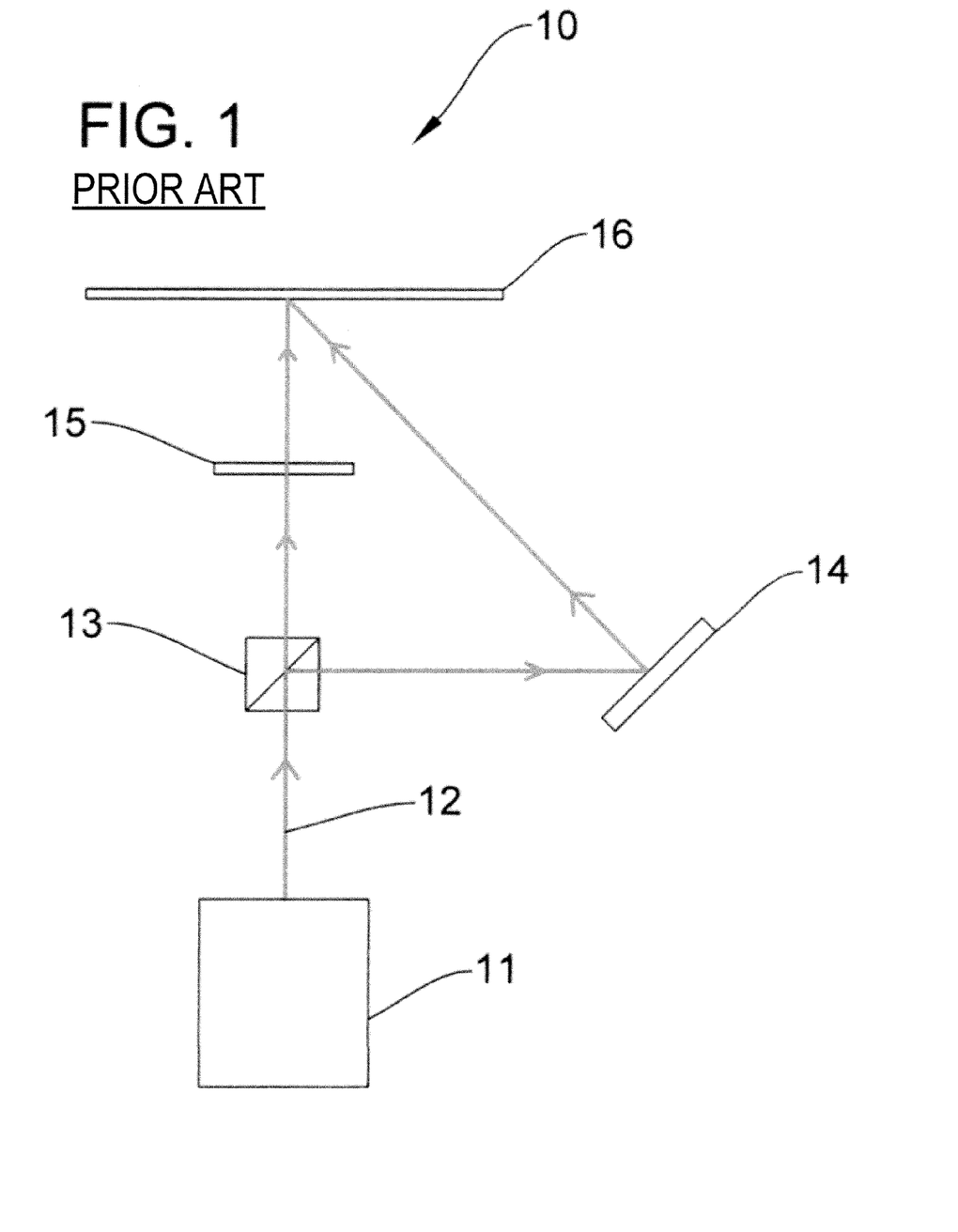
FIG. 1 shows one exemplary prior art holographic data writing application that uses a liquid crystal device.

FIG. 1 shows one exemplary prior art holographic data writing system 10 that uses a liquid crystal device 15, a laser source 11, a beam splitting cube 13, a mirror 14, and a recording/storage medium 16. Laser source 11 outputs a high-energy beam of blue or ultra-violet (UV) light 12 that commonly has a narrow band wavelength of 405 nm, but may range down in wavelength to 250 nm. In the example of FIG. 1, beam splitting cube 13 splits light 12 into a first and a second optical path. Liquid crystal device 15 modifies the light of the first optical path, and mirror 14 reflects the light of the second optical path to combine with the modified light of the first optical path at recording/storage medium 16. Other optical elements may be included within the first and second optical paths and are not shown for clarity of illustration. For example, one or more of a collimator, a wave plate, a polarizer, a retarder, a prism, and a photodiode may be included within holographic data writing system 10. Light of the first optical path causes instability and degradation of liquid crystal device 15, since these prior art liquid crystal devices typically use an organic thin film polymer for the liquid crystal alignment layer.

Figure 2:
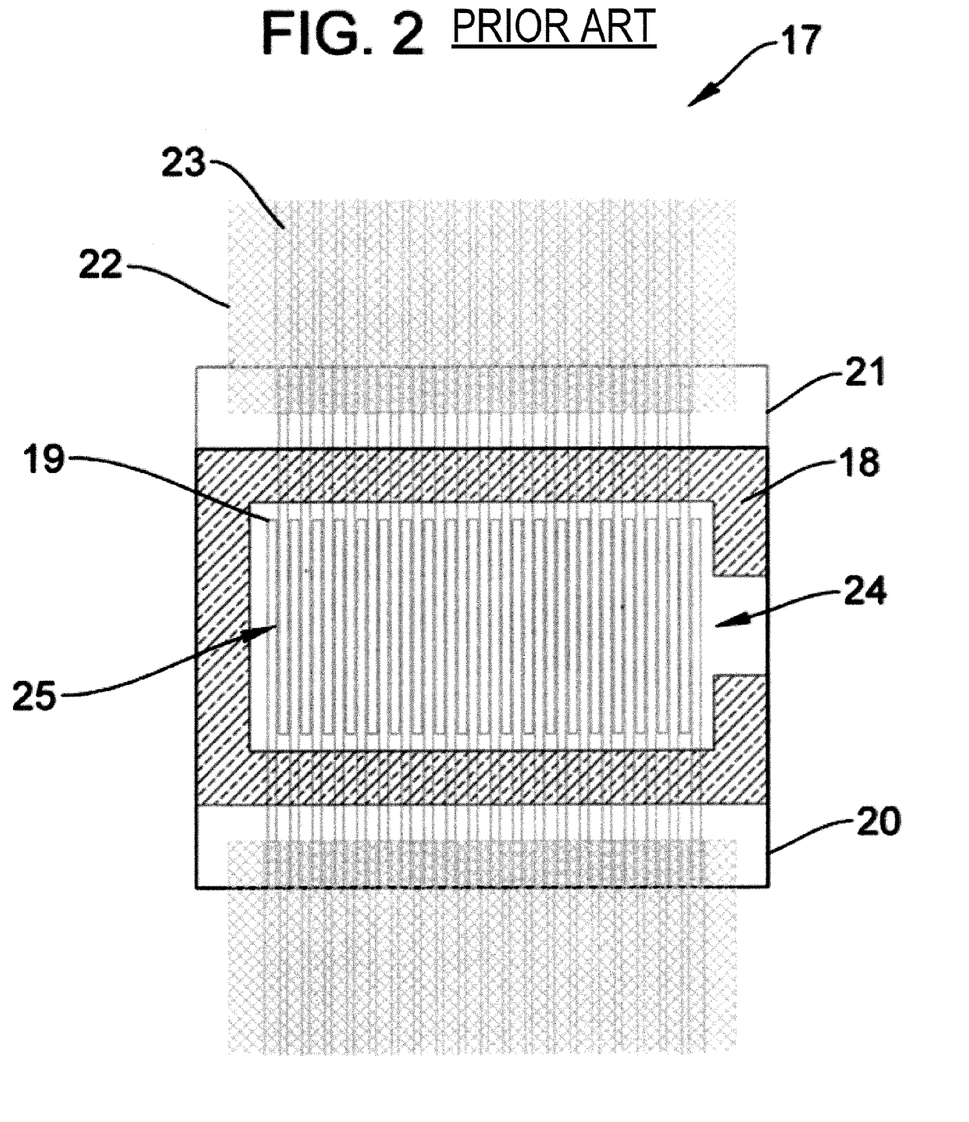
FIG. 2 shows a top view of one exemplary prior art liquid crystal device.

FIG. 2 shows a top view of one exemplary prior art liquid crystal device 17. Liquid crystal device 17 has a liquid crystal device cavity 24 that is defined by a perimeter gasket 18 (e.g., an adhesive seal) and has interlaced pixel columns 19 defining clear aperture or active region 25. Liquid crystal device 17 also has contact ledges 20 and 21 for electrical connectivity to driving circuitry (not shown) via a flex cable 22 for example. Flex cable 22 has anisotropic conductive adhesive traces 23 that align with ITO traces of contact ledges 20, 21 of liquid crystal device 17. Flex connection to these ITO traces on liquid crystal device 17 is often made using both heat and pressure. An opposite end (not shown) of each flex cable 22 is often attached to a printed circuit board (PCB) containing the driving circuitry.

Different applications of this liquid crystal device involve different methods of use and different types of radiation for manipulation by the device. In certain applications the entire clear aperture of the device may be flooded with a high intensity broad wavelength range of electromagnetic radiation. In other applications, only a very small region of the device is exposed to high energy radiation, such as a 300 micron diameter single wavelength blue laser beam.

Liquid crystals, when built into a liquid crystal device, are very sensitive to the surfaces on which they align. These surfaces determine the direction, anchoring strength, and the pre-tilt (the amount of tip in the long chain molecules that are contacting the surface) of the liquid crystal molecules inside the device. In most cases, these surfaces on which they align are formed of an organic, polymer film called polyimide.

In a liquid crystal device, an alignment layer aligns the long direction of liquid crystal molecules to the direction of the rub treatment. The molecules at the surface also require a small amount of tilt (called pre-tilt) such that when the liquid crystals are manipulated with electric or magnetic stimuli, the average motion of all of the liquid crystal molecules is in the same direction. Pre-tilt is a critical aspect in obtaining sufficient liquid crystal alignment. Most liquid crystal displays and devices today utilize a thin polymer film, called polyimide, as the alignment thin film. The film is coated on top of the transparent conductive oxide (TCO) (typically ITO). The utilization of this material in liquid crystal device construction is reasonable from both cost and process perspective. Polyimide allows for consistent and repeatable liquid crystal alignment in association with the industry standard rubbing process. However, polyimide is absorptive of UV and blue wavelengths of light, and readily degrades in these wavelengths because it is an organic material. The amount of absorption of a polyimide film is related to variables such as polyimide type, film thickness, and crosslink density of the film.

Alignment of liquid crystals on rubbed oxides has been studied in the past, M. Nakamura, J. Appl. Phys. 52(7), July 1981, 4561-4567. Generally, the TCO that is used as an electrode layer in liquid crystal devices is a dense crystalline structure and is resistant to scratching and abrasion damage. The typical alignment layer processing, called rubbing, does not allow for liquid crystal alignment on this type of surface. Abrasives and oxide powders may be used to obtain alignment on more dense oxide films; however, the quality of the alignment obtained has proven unacceptable, thus requiring the use of the polyimide material.

Degradation of the polyimide material causes changes in the pre-tilt and anchoring strength of the liquid crystal molecules at the surfaces, which in turn changes the unbiased retardance of the liquid crystal device, and also causes changes in the electro-optical response of the liquid crystal when a bias is applied. Speed of the polyimide film degradation is dependent on factors such as wavelength, energy density, exposure length, liquid crystal type, and mode. In UV and blue wavelengths with high energy densities, changes in the liquid crystal electro-optic properties may be realized in a matter of hours, and complete failure may be realized in hundreds of hours. This failure rate is unacceptable in many systems, and users require a more robust solution. The liquid crystal material itself is subject to degradation. It is likely that certain formulations of liquid crystal will offer improved robustness to degradation, however; this robustness will be dependent on source wavelength and energy density. Liquid crystal absorption may be measured using a spectrometer in the region of interest of wavelength. By using this metrology technique one may draw absorption comparisons between different liquid crystal types or formulations. The liquid crystal material is also suspect to contamination, some of which may be generated from the degradation of the polymer alignment layer. U.S. Pat. No. 7,184,109, incorporated herein by reference, shows novel approaches to dealing with contaminated liquid crystal inside a cell.

It is known that polyimide decomposes when exposed to UV wavelengths of light and it is also known that it will degrade even within the visible spectrum at wavelengths between 400-500 nm. It is generally observed that liquid crystal devices are stable within the visible light spectrum between 500 nm and 700 nm. However, there is limited data of device performance and stability in high energy exposure within 500 nm to 700 nm, and particularly beyond 700 nm into the infrared (IR) spectrums. Liquid crystal material itself is organic in composition and may also decompose under intense electromagnetic radiation. When used with electromagnetic radiation of blue and UV wavelengths, the polyimide layer absorbs energy that decomposes the polyimide film. Because of the sensitivity of liquid crystal at the alignment surfaces, the liquid crystal response to applied voltage is affected by degradation changes occurring in the polyimide layer when it is continually exposed to high-energy radiation. Degradation of liquid crystal devices include: 1) a change in liquid crystal pre-tilt at the surface(s); 2) loss of liquid crystal alignment at the surface(s) due to a reduction in liquid crystal anchoring strength, and increased ionic contamination caused from pre-existing mobile ions in the liquid crystal and/or thin film layer(s); and 3) ions generated from the degradation of the alignment layer, or a combination of both ion contamination types. Any of these changes, alone or in combination, may affect the unbiased retardance, as well as the electro-optic characteristics, of the liquid crystal device within the area of electromagnetic radiation bombardment, which result in unstable and undesirable changes experienced by a user of the liquid crystal device.

Liquid crystal device stability and resistance to degradation are requirements for many applications. Subtle changes and instability in liquid crystal devices are unacceptable to many users of these devices. Given the use of higher energy density electromagnetic radiation at more destructive wavelengths, as required by emerging applications, an improved and robust liquid crystal device solution is needed.

The current technique for improving the liquid crystal device stability and resistance to degradation is to replace the organic polymer alignment layer with an inorganic material to which the liquid crystals properly align. Examples of such inorganic materials are silicon oxide and silicon dioxide. Silicon dioxide is typically deposited using an ion beam vacuum deposition process, where the substrate is typically positioned at some incident angle from normal. It is the geometric columnar structure and directionality of this deposited film that allows for adequate alignment of the liquid crystal molecules to the film. Obliquely deposited silicon oxide has been used in the construction of liquid crystal devices for many years, and was the main method for obtaining alignment before the invention of polyimide materials, and associated thin film processing. A description of silicon dioxide processing may be found in a paper by John L. Janning, "Thin Film Surface Orientation for Liquid Crystals", Journal of Applied Physics, Vol 21, No. 4, 1972.

It has been proven that an inorganic silicon dioxide film, when used as an alignment layer, improves device stability and delays the degradation when exposed to UV radiation as described by Wen et al., Journal of the SID Sep. 13, 2005, 805-811. However, there are several shortcomings with this alignment layer solution. The deposition process is time consuming and requires expensive equipment. Many coating recipes also require two or more separate coating runs at potentially different thicknesses. Variations in the film(s) become increasingly difficult to control as substrate size increases, and substrates are prone to contamination. Thus, the realized improvements in the liquid crystal device may not outweigh the costs in achieving them. The exposure conditions for testing device stability and longevity are much harsher than what is seen in actual applications. The problem with real time and true source testing is that it may take considerable time to obtain results; acquiring sources represented in actual applications may be expensive. The results in many life tests have been accelerated, making it difficult to extrapolate the degradation result to a real time application. The instabilities reported by Wen et al. (2005) are measured and tested against polyimide samples, and all samples experience short-term exposure (less than 200 hours). Contemporary liquid crystal device users require 1,000 to 10,000 hours of device stability, so improvements to device longevity and stability of a few hundred hours likely will not apply to an application requiring thousands of hours with little or no change.

SUMMARY

In an embodiment, a holographic writing system includes:
a recording medium;
a laser source for generating a beam of electromagnetic radiation;
a beam splitter for splitting the beam into a first split beam and a second split beam;
a liquid crystal device having at least one conductive alignment layer, the liquid crystal device modifying the first split beam to form a modified split beam, the modified split beam impacting a point of the recording medium; and
a mirror for reflecting the second split beam to impact the point;
wherein the liquid crystal device resists degradation by the electromagnetic radiation.

In an embodiment, process for manufacture of a liquid crystal device includes the steps of:
depositing conductive material onto a first surface of each of a first and second substrate;
forming a surface of the deposited conductive material into an alignment surface;
forming at least one gasket onto the first surface of at least one of the first and second substrates;
joining the first and second substrates using the at least one gasket to form at least one cavity directly between the alignment surface;
injecting liquid crystal molecules into the at least one cavity; and
sealing the at least one cavity.

In an embodiment, a method for forming a dual function alignment layer of a liquid crystal device includes:
  depositing a conductive material onto at least one substrate of the liquid crystal device; and
  treating a surface of the conductive material to form an alignment surface from the conductive material.

In an embodiment, a liquid crystal device has:
  a first substrate and a second substrate, at least one of which is transparent;
  a first rubbed, conductive surface formed on a first surface of the first substrate;
  a second rubbed, conductive material formed on a first surface of the second substrate;
  a cell gasket for spacing apart the first and second substrates and to form a cavity therebetween; and
  liquid crystal molecules filling the cavity.

In an embodiment, a dual-function alignment layer of a liquid crystal device has:
  a rubbed, conductive material for direct interface between liquid crystal molecules and a substrate of the liquid crystal device, the conductive material providing both an electric field to the liquid crystal molecules, and also pre-tilt alignment of the liquid crystal molecules when no electric field is present.

DETAILED DESCRIPTION OF THE FIGURES

A dual-function alignment layer serves as both the surface to which the liquid crystal molecules uniformly align and as an electrode by which the liquid crystal molecules are manipulated. This dual-function alignment layer may be used in many types of liquid crystal devices and displays, and simplifies the cell construction as well as offering improved device stability and resistance to radiation degradation. This dual-function alignment layer is a unique improvement in liquid crystal device design that enhances performance and longevity. Materials comprising liquid crystal devices are commonly organic in composition, and may change or breakdown under high-energy radiation. Liquid crystal display and device reliability is important for existing and evolving applications. Device stability and resistance to degradation from radiation top the list for many customer liquid crystal component requests. Particularly, there is demand for improved liquid crystal device resistance to electromagnetic radiation at ultra-violet (UV) and blue light wavelengths where prior art liquid crystal device types quickly become unstable and may completely fail in just a few hundred hours. Liquid crystal devices may quickly degrade with energies and wavelengths outside of the UV and blue regime; however, more testing will be required to better understand responses under these conditions.

Figure 3:
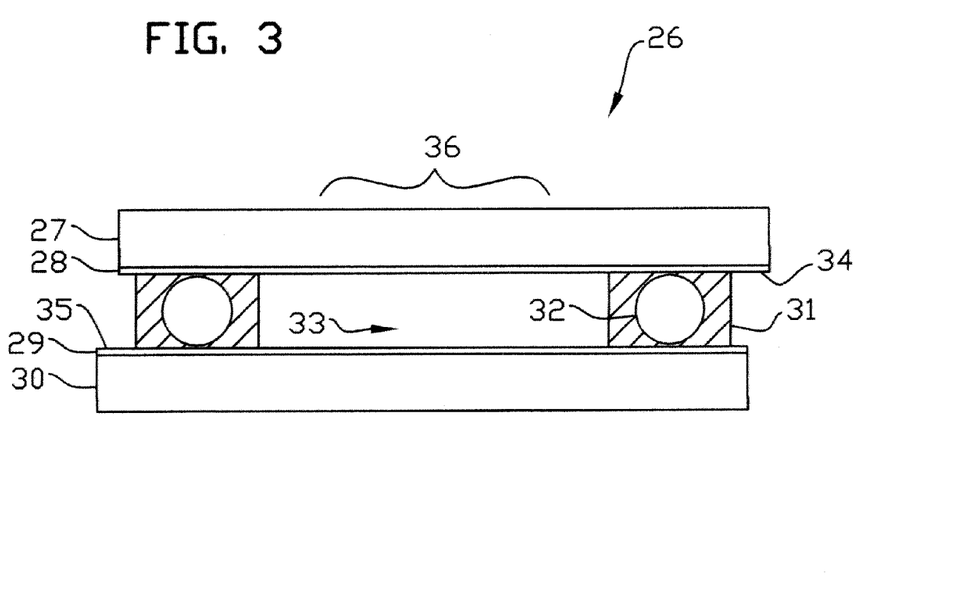
FIG. 3 shows one exemplary embodiment of a liquid crystal device incorporating dual-function alignment layers.

FIG. 3 shows a cross-section of one exemplary liquid crystal device 26 utilizing dual-function alignment layers 28 and 29. Device 26 has a top substrate 27 and a bottom substrate 30 bound together and evenly spaced by a cell gasket 31. Cell gasket 31 is formed of an adhesive or an epoxy and spacer particles 32 of substantially uniform size. Cell gasket 31 and substrates 27, 30, form a cavity in which a liquid crystal 33 resides. Spacers 32 establish a substantially parallel spacing between an internal surface of top substrate 27 and an internal surface of bottom substrate 30. Spacers 32 may be made of one or both of plastic and glass and shaped as one or both of spheres and rods. Spacers 32 are mixed into the adhesive or epoxy and distributed over a surface of one of substrates 27 and 30 using a sprayer machine or mechanism, or both, to form cell gasket 31. Spacing between top substrate 27 and bottom substrate 30 is typically in the order of 1's or 10's of microns. Clear aperture 36 of liquid crystal device 26 may be defined as a certain distance from an internal edge of cell gasket 31, or may be defined by some other means such as an aperture defined by a housing that holds liquid crystal device 26. Clear aperture 36 is also sometimes referred to as the active area, and forms the useable, optically functional, area of liquid crystal device 26.

Dual-function alignment layers 28, 29 are formed on internal surfaces of substrates 27 and 30, respectively. Dual-function alignment layers 28, 29 may include one or more of Indium (In) Tin (Sn) oxide (ITO), Indium oxide, Tin oxide, Zinc (Zn) oxide, Aluminum (Al), Gold (Au), Silver (Ag), and exotic oxide variations of said metals, and exotic metal oxides doped with one or more of Molybdenum (Mo), Tantalum (Ta), Zinc, or Gallium (Ga). Dual-function alignment layers 28, 29 thus form amorphous TCO electrodes for liquid crystal device 26 and may be "rubbed" to provide liquid crystal alignment.

Since dual-function alignment layers 28 and 29 are formed of a "soft" amorphous oxide, these layers will accept a typical or varied surface rubbing treatment and thereby form a combined electrode layer and liquid crystal alignment layer. The amorphous transparent conductive oxide may be deposited using conventional deposition equipment and processing. An example of an amorphous TCO is Indium Tin Oxide (ITO). Typically, ITO is deposited at high temperatures, of the order of 300 degrees Celsius, that result in increased film density, hardness, and lower resistance properties. However, by applying the ITO at a lower temperature ranging from room temperature to 200 C, the ITO layer remains amorphous and softer than the typical ITO. Adhesion of the ITO will be dependent on the coating recipe variables and the surface on which it is coated. The ITO may also be optimized for reduced absorption at wavelengths of interest by adjusting coating recipe variables.

Amorphous ITO may be used as an electrode in display applications having an internal color filter, and may be used in a device constructed with a flexible substrate. In the prior art, however, the amorphous ITO film is coated with a polyimide layer to form the alignment layer for a liquid crystal material. The amorphous nature of the ITO allows for a flexible substrate to bend and bow without causing breaks or fractures in the thin film, as occurs with a typical, dense ITO film on a flexible substrate.

The low temperature amorphous ITO deposition process also allows for coating substrate types (e.g., plastic) that are less tolerant to high temperature thermal exposures and would melt or gel under higher temperature conditions. The amorphous TCO layer allows common rubbing practices to treat its surface to provide uniform liquid crystal alignment. The liquid crystal anchoring strength and pre-tilt correlate to the rub treatment parameters. By making the TCO layer amorphous, the present system eliminates the requirement for a separate alignment layer film deposition step, and facilitates liquid crystal device construction to provide a device that is inherently more robust against electromagnetic radiation degradation and offers an improved life performance.

In the example of FIG. 3, layers 28 and 29 are also located beneath cell gasket 31; however, other configurations may exist where TCO is selectively removed in regions of glue placement. The only requirement in this scenario would be that TCO traces remain as a bridge to the contact ledge to maintain electrical connectivity. A more complex cell design is discussed in further detail below in reference to FIG. 5.

Electrical connections 34, 35 are commonly made at the site of contact ledges. Leads may be connected using different types of solders, conductive adhesives, anisotropic adhesives, heat seal flex materials, clips, wire bonding, etc. AC waveforms are used to drive liquid crystal devices, and the material response is independent of waveform and polarity. The applied bias to each TCO electrode creates a field that changes the liquid crystal molecules' directionality, which in turn alters the phase of light as it passes through the layer. FIG. 3 is a simple illustration of a liquid crystal device where the electrode of each substrate is not patterned to create rows, columns, or pixels. This example's electrodes are solid surfaces that cover the complete plane of each substrate, which means all of the liquid crystal that lies upon this electrode plane within the gasket region will respond to an applied electric field. The solid surface configuration can therefore function as the dual-function alignment layer. According to an embodiment of the invention, the inventive dual-function alignment layer may also be patterned to create rows, columns and pixels of different geometries, and may be utilized in a liquid crystal device as either one or both of the electrodes. Patterned electrodes may create complications due to edge effects and potential light leakage created in the spaces between the electrodes due to the lack of liquid crystal alignment in these regions. However, these complications may be acceptable in many liquid crystal applications, or there may be potential solutions for dealing with these problem types, as discussed below.

Figure 4:
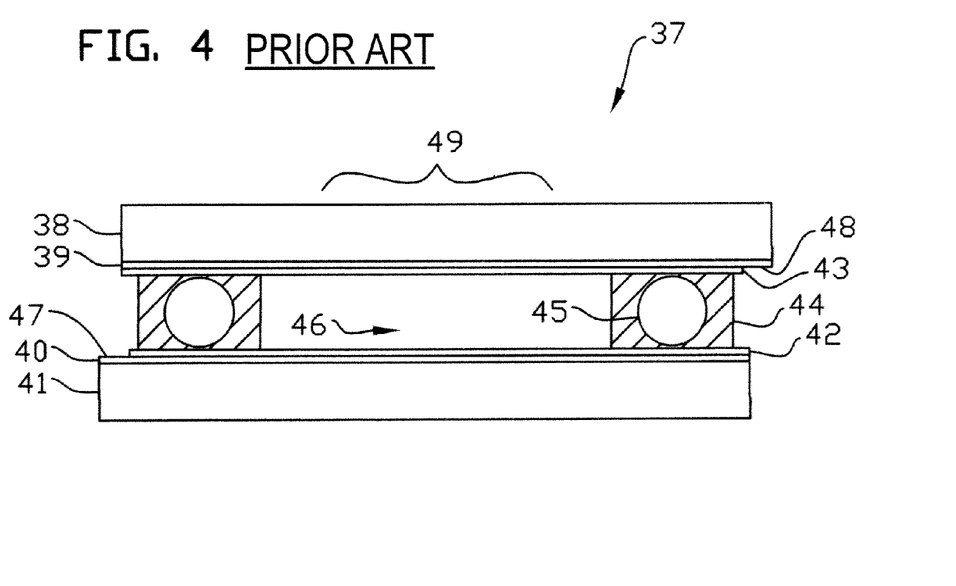
FIG. 4 shows one exemplary prior art liquid crystal device having an alignment layer film on top of a TCO.

FIG. 4 shows one exemplary prior art liquid crystal device 37 utilizing typical polyimide alignment type layers 42 and 43. Again, the cell is comprised of a top substrate 38, and a bottom substrate 41, and typically these substrates are display grade glass. Gasket 44 is formed with adhesive and/or epoxy and is used to form a cavity that contains the liquid crystal in the cavity 46. Spacer material 45 is mixed into the gasket glue, distributed across the entire substrate plane, or both. Each substrate has a thin film electrode 39 and 40 (typically ITO). The main difference in this cell example is that the alignment layer 42 and 43 on each substrate is a separate layer. As noted earlier, these layers are typically polyimide that is deposited as a separate layer on top of each electrode. Some liquid crystal device manufacturers remove the polyimide layer from the electrical connection points 47 and 48 in order to obtain more reliable connectivity at these junctions; otherwise, the connection type must break through the polyimide film to allow for adequate electrical connections and adhesion. The same holds true if an internal crossover 58 is utilized, and in this configuration, either the polyimide needs to be selectively removed from the crossover locations on each substrate, or the conductive metallic material must be able to break through the polyimide layers to create a complete and reliable connection. The polyimide also acts as a dielectric and causes an increased voltage drop across the electrode plane, which ultimately results in a higher required voltage to reach the threshold voltage (activation) of the liquid crystal.

Layers 39 and 43 may be replaced by a dual-function alignment layer (e.g., layer 28, FIG. 3) and layers 40 and 42 may also be replaced by a dual-function alignment layer (e.g., layer 29, FIG. 3). When using dual-function alignment layers, there is no need for the extra process step to remove the alignment layer (e.g., layers 42, 43) at connection sites 47, 48. Also, the absence of a dielectric across the electrode allows for lower liquid crystal threshold voltages and potentially faster liquid crystal response times. There may also exist an increase in device transmission due to the absence of the two polyimide alignment film surfaces that absorb a few percent of the visible spectrum as it passes through the device.

Figure 5:
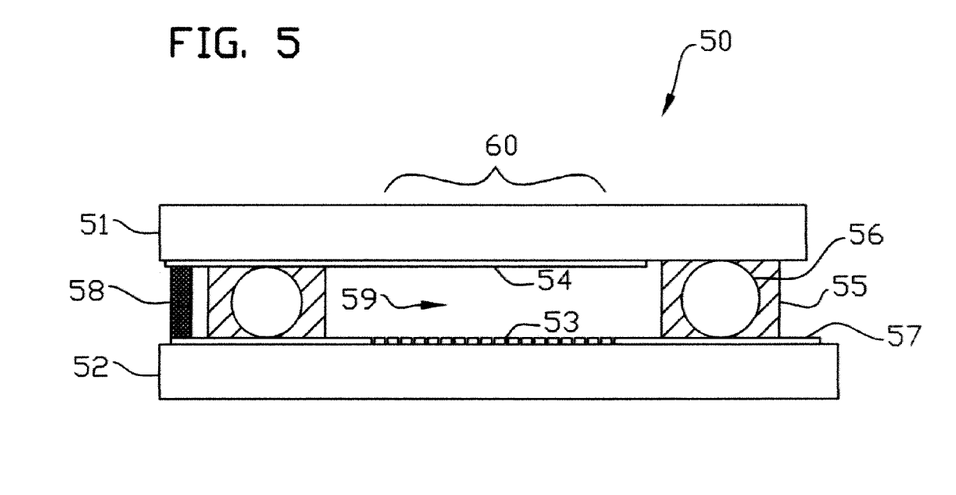
FIG. 5 shows one exemplary embodiment of a liquid crystal device incorporating dual-function alignment layers.

FIG. 5 shows one exemplary liquid crystal device 50 that utilizes dual-function alignment layers 53 and 54. The gasket 55, spacers 56, liquid crystal cavity 59, and clear aperture 60, maintain the descriptions given in previous examples.

According to an embodiment of the invention, different substrate types and configurations may be used in conjunction with a dual function alignment layer. The composition of top substrate 51, and the bottom substrate 52 may be display grade glass, quartz, fused silica, borosilicate, aluminosilicate, alkali-barium silicate, alkaline earth boro-aluminosilicate, sodalime, amorphous silicon, polysilicon, single crystal (monocrystal), CdSe, and plastics and flexible substrate material of glass or plastic. At least one substrate is transmissive to get light through the liquid crystal layer and back out of the device. It is also common to match substrate thermal coefficients (CTE) in cell construction to minimize stress on the glue in fluctuating thermal environments.

In some devices, using the same substrate composition for the top and bottom plates is not possible, such as in a microdisplay. In these circumstances, matching the thermal coefficients (CTE) of both substrates as closely as possible is the next best alternative, such as using Corning Eagle display glass as a top substrate mated to a silicon backplane of a microdisplay. The CTE of Corning Eagle 2000 display glass is $31.8 \times 10^{-7}$/deg. C., which is very close to that of silicon. Different material composition between the top substrate and the bottom substrate allows for the construction of unique device types. A microdisplay is an example of a reflective device, where light transmits through the liquid crystal layer twice, first when entering through the transmissive substrate and second when that light reflects off the silicon substrate surface (typically aluminum mirrors) and travels back through the liquid crystal layer. A transmissive device is comprised of two transmissive substrates that pass nearly all light that is transmitted into the device.

An example of a transmissive device is a liquid crystal variable retarder. There may exist some external and internal reflections that cause a measurable percentage of light loss, but these reflections can be many times improved upon or recovered with using index matched films and anti-reflection coatings. Other coatings, such as a color filter in an active matrix design, may cause even further light loss. A PDA (personal digital assistant) is an example of a transflective device. Transflective device types incorporate both transmissive and reflective display properties, where the device uses a backlight for indoor display readability, and may also use ambient lighting (such as the sun) for readability when outside.

According to another embodiment of the invention, the dual function alignment layer 54 on the top substrate, and the dual function alignment layer 53 on the bottom substrate, as built into a liquid crystal device, may be solid or patterned. The pattern may include, but is not limited to pixels, rows, columns, or other geometric designs and may use one or more of photolithography, thin film photolithography and etching processes, laser etching, ion reactive etching with a plasma and associated mask materials, and processes known with respect to active matrix panels and silicon Complementary Metal-Oxide Semiconductors (CMOS). However, the spaces between the etched geometries may yield regions with no liquid crystal alignment. This lack of alignment will result in light leakage in these areas which may impact device qualities such as dark state and contrast ratio. Since the liquid crystal is not aligned properly in these areas, there may also occur "edge" effects at the edges of the conductor geometry near the space, which could result in disclinations or some other phenomenon.

Figure 6:
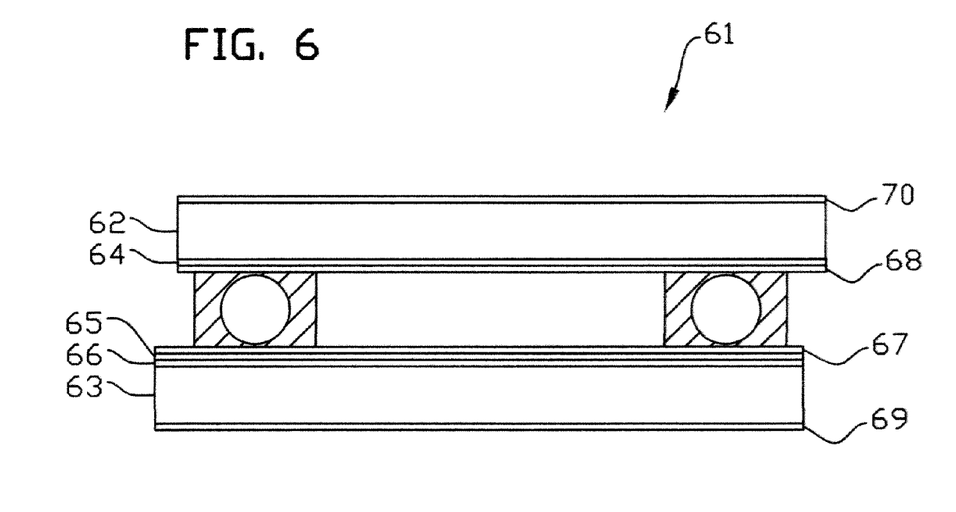
FIG. 6 shows one exemplary embodiment of a liquid crystal device utilizing dual-function alignment layers.

The general trend for many liquid crystal devices is a reduction in pixel and space size (pitch), which inherently minimizes the interpixel regions. For example, in a microdisplay pixel region there generally exists a very small region of "interference" between the sides of the pixels. These regions are referred to as fringe field effects and may be caused from pixel to pixel voltage competition of liquid crystal in the non-active areas. Because these spaces are quite small (less than 1 micron wide), the net affect is typically tenths of a percent in light loss. On larger pitch liquid crystal electrode architecture, minimizing the space between geometries will result in less area affected by the non-alignment regions. In architectures with very wide spaces between electrodes, masks may be used to block these areas. The example of FIG. 5 has linear column pattern 53 on the bottom substrate, and solid electrode 54 on the top substrate. There is a single contact ledge 57 where single or multiple connections may occur across the ledge. This design incorporates an internal crossover connection 58 that allows for a direct electrical connection from the top electrode 54 to the bottom electrode 53, and eliminates the requirement for two contact ledges as shown in the examples of FIGS. 3, 4, and 6.

Different types of liquid crystal devices use different liquid crystal modes, so the liquid crystal type and alignment configuration choices are important in obtaining a desired optical response. The dual function alignment layers (e.g., layers 53 and 54) may be used in, but not limited to, electrically controlled birefringence (ECB—antiparallel planar alignment), twisted nematic (TN), super twisted nematic (STN), Pi (parallel planar alignment), polymer dispersed (PD), stressed polymer dispersed, ferroelectric, vertical alignment (VA), twisted vertical alignment, in-plane switching (IPS), and blue phase liquid crystals and modes, including externally compensated versions of the above modes using wave plates or polycarbonate film retarders.

According to another embodiment of the invention, the transparent conductive oxide may consist of any number of materials. Material choice is mainly dependent on the device type. Some materials are inherently more difficult and costly to deposit, such as Au or Ag. The most common TCO electrode used in the construction of liquid crystal devices today is ITO. ITO material properties and low cost make it appealing for use in liquid crystal devices. ITO generally demonstrates high optical transmission and has conductive properties suitable for driving liquid crystals. It is also a durable thin film due to its dense, crystalline structure upon standard deposition conditions. Because of its hardness, it is difficult to alter its composition, which in turn eliminates it as a choice for an alignment layer.

An example of an inventive process of treating a standard ITO (as well as other organic and inorganic materials) layer to obtain liquid crystal alignment is disclosed in U.S. Patent Application Publication No. 2006/0209241, incorporated herein by reference. This technique is not practical as a liquid crystal device manufacturing process for devices using ITO, due to the costs, time, and equipment associated with the process, as well as the inconsistencies in the treated film over a larger surface area and the liquid crystal alignment problems caused from these inconsistencies. However, according to the present Application, an amorphous, low temperature ITO is far softer than a typical high temperature ITO material, and allows for film manipulation using typical equipment in the liquid crystal device and display alignment layer treatment process.

The process disclosed by U.S. Patent Application Publication Number 2006/0209241 uses an anode layer thruster that generates direct current plasma to produce an ion flux. The beam source may be collimated and contains a combination of ions, neutral atoms, electrons, protons and deep UV of which all are believe to contribute to the surface modification. The gases used to excite the plasma are preferably inert, such as Argon (Ar). Variables that may affect the results of the layer modification by the ion bombardment may include current density, ion energy, length of time of irradiation, chamber pressure, collimation, substrate surface angle and distance to the plasma beam, and the composition of the surface film and its thickness. Examples shown in U.S. Patent Application Publication Number 2006/0209241 generally relate to organic film modification. An example of modification of indium tin film is not included. One might expect different ITO film densities to require different ion etching variables. It is likely that a standard crystalline ITO film requires a higher current density, which in turn would affect the film etch rate. This variability may potentially reduce the process window for obtaining predictable and repeatable results.

Dual-function alignment layers made from TCO may also provide advantages when using an ion bombardment technique to produce an alignment surface because of the softer material characteristics of the film. For ion bombardment, the softer material characteristics may require less energy than required for milling a more dense film. This softer material may also offer advantages for reducing process variables such as pressure, ion energy, and time, and may improve upon the inorganic thin film treatment repeatability and surface size limitation.

The alignment layer rub process is very well known to the liquid crystal display manufacturing industry and commonly used. It is a simple concept but may be rather complex to implement as a process. The process has been successfully developed and is used in conjunction with polymer thin film alignment layers, such as polyimide. The variables in this process that may affect the liquid crystal alignment on the polymer layer include machine cylinder rotation speed, cylinder angle, fiber/pile deflection depth, substrate stage translation speed, stage angle, number of passes (single treatment direction) or cycles (both forward and reverse segments) under the cylinder, and pile material composition.

An advantage of the present dual-purpose alignment layer, such as amorphous low temperature ITO, is that it may be treated using the same equipment currently used for polymer alignment layers. However, rub parameters may require optimization for each amorphous film's characteristics. The process optimization might include subtle or significant changes to rub variables such as the rub depth (pressure), cylinder speed, stage speed, and number of passes under the cylinder. The advantage of using the typical rub process is that the equipment and materials are readily available, and no new or different equipment is required for implementation. Some negative aspects of the rub process on polymer films is that it is a dirty process and introduces contamination onto the surfaces from the rubbing material itself. It may create contamination by damaging the polymer film and re-distribute polymer flakes across the surface, it may create visible artifacts in the driven and un-driven device that follow the direction of the rub, and the process may generate a charge imbalance on the thin plastic layer. The structure of the present inorganic dual-function alignment layer, however, is more durable than a polymer, is less likely to damage or result in particulate contamination, and friction across the conductive surface may not result in a charge imbalance due to the conductive property of the layer.

The reasons liquid crystal aligns to a rubbed polyimide surface are based upon a number of theories, but it has been difficult for scientists to prove these theories due to the nature of the liquid crystal material response in the device, as well as the difficulty in determining absolute methods for quantifying liquid crystal behavior at the surfaces. It is likely a combination of the theories that contributes to the successful alignment and function of the liquid crystal. One of these theories is that the rub process, where fibers contact and move across the polyimide surface, creates microgrooves in the polyimide surface. This theory has some substantiality based on the work performed and reported by T. Ito et al., Society for Information Display 92 Digest, pp. 393-396, wherein it is suggested that microgrooves are generated during the rub process. Microgrooving is also at least part of what allows for liquid crystal alignment on the dual function amorphous oxide layer. The formation of the uni-directional microgrooves in the direction of the rub on the dual-function alignment layer occurs on the soft oxides as it does on polyimide materials. These grooves yield a directionality that the long chain liquid crystal molecules prefer to lay uniformly. The effectiveness of the microgrooving with relation to the liquid crystal alignment behavior is directly dependent on the rub parameters. Too heavy of a rub may produce a visible streaking in the direction of rub in the finished device, and too light of a rub may yield areas of different liquid crystal alignment domains or of a very poor alignment due to a very low liquid crystal molecule pre-tilt at the surface.

FIG. 6 shows one exemplary liquid crystal device 61 utilizing dual-function alignment layers 67 and 68. Liquid crystal device 61 has a top substrate 62 and a bottom substrate 63 (similar to substrates of FIGS. 3, 4, and 5). Top substrate 62 is first coated with a thin film 70 on an outer surface and a thin film 64 on an inner surface. A dual function alignment layer 68 is then applied over thin film 64. Similarly, an outer surface of bottom substrate 63 is first coated with a thin film 69 and an inner surface of bottom substrate 63 is coated with a thin film 66. A second thin film 65 is applied to thin film 66, and then a dual-function alignment layer 67 is applied to second thin film 65.

The films beneath the alignment layer are not limited in number and composition. One example may be thin films that are used for index matching the ITO to the surface of the substrate or the liquid crystal material. Silicon oxide and dioxide ($SiO_2$), tantalum pentoxide ($Ta_2O_5$), and magnesium fluoride ($MgF_2$) are common materials used for index matching ITO to glass and liquid crystal. The coating house performing the ITO deposition commonly deposits these materials by thin film design, and the amorphous, low temperature ITO may replace standard, high temperature ITO materials in this example. Certain liquid crystal device types have, beneath the electrode, one or more layers that are organic, such as an acrylate, acetate, resist, polyimide or some other type of thin film. In these devices, the present low temperature ITO is advantageous over known processes and materials because the standard ITO deposition process uses high temperatures not withstood by these substrate materials. One example of these advantages can be seen in the case of a liquid crystal device formed with plastic substrates. Plastics are far less rigid than glass and may gel or melt during standard ITO deposition processes. A low temperature ITO, however, due to its amorphous film structure, may conform more to substrate flexing, as well as allow for coating a substrate that might otherwise melt or change its composition in the high temperature ITO deposition process.

As shown in FIG. 6, thin film layers may exist on both substrates beneath dual-function alignment layers 67 and 68, and, in this example, top substrate 62 has only one thin film 64 beneath the dual function alignment layer 68, whereas bottom substrate has two layers 65 and 66 beneath dual-function alignment layer 67. The device stability in circumstances of a organic layer(s) beneath the dual function alignment layer are yet to be studied; however, one might predict improved stability and longevity of the liquid crystal behavior and electro-optic response under high energy and harmful wavelength conditions because the liquid crystal material is not aligned to or in contact with the organic film.

As shown in FIG. 6, thin film coatings are included on the outside of each substrate. Top substrate 62 has an outer thin film 70 and the bottom substrate 63 has an outer thin film 69. In many liquid crystal device types, these outer coatings are anti-reflection coatings that greatly reduce the primary reflection off the glass surface, which ultimately increases the total electromagnetic transmission through the liquid crystal layer.

Where two or more liquid crystal devices are to be built into a single component cell stack, thin film 70 may represent a dual-purpose alignment layer of a next liquid crystal cell, thereby removing the necessity of laminating two separately formed devices using an optical adhesive.

Figure 7:
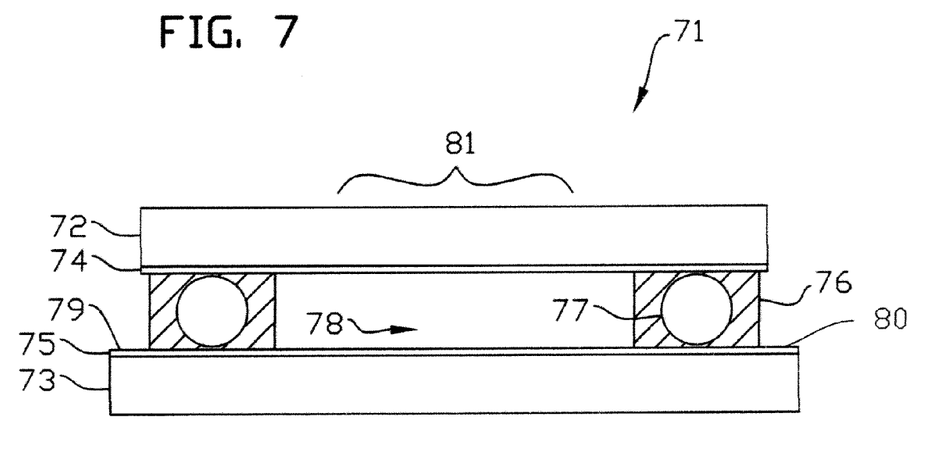
FIG. 7 shows one exemplary embodiment of a liquid crystal device utilizing dual-function alignment layers.

FIG. 7 shows one exemplary liquid crystal device 71 with dual-function alignment layers 74 and 75. Liquid crystal device 71 has substrates 72 and 73, dual-function alignment layers 74 and 75, a cell gasket 76, spacers 77, a liquid crystal cavity 78 and a clear aperture 81. Components of device 71 are similar to components of previous figures. However, device 71 has electrical contact sites 79 and 80 that are not located on opposing (top and bottom) substrates 72, 73, but rather are located on bottom substrate 73. The electrical connection (not shown) to the top plate 72 occurs on an overhanging ledge in the z-axis direction in this drawing, and is not visible in this cross-sectional view.

The benefits of the present dual function alignment layer are two-fold. First, it offers an improved solution for device stability and longevity under UV and blue wavelengths of light and high intensity electromagnetic radiation exposure, due to its inorganic composition and simplified construction. Second, it simplifies the liquid crystal device assembly process by eliminating the need for a separate alignment layer to be deposited on to the electrode surface, thus removing one or more process steps in the manufacturing of the device. This solution utilizes current alignment layer treatment processes to obtain liquid crystal alignment to its surface, and may be utilized in some fashion in many liquid crystal device and display configurations.

Figure 8:
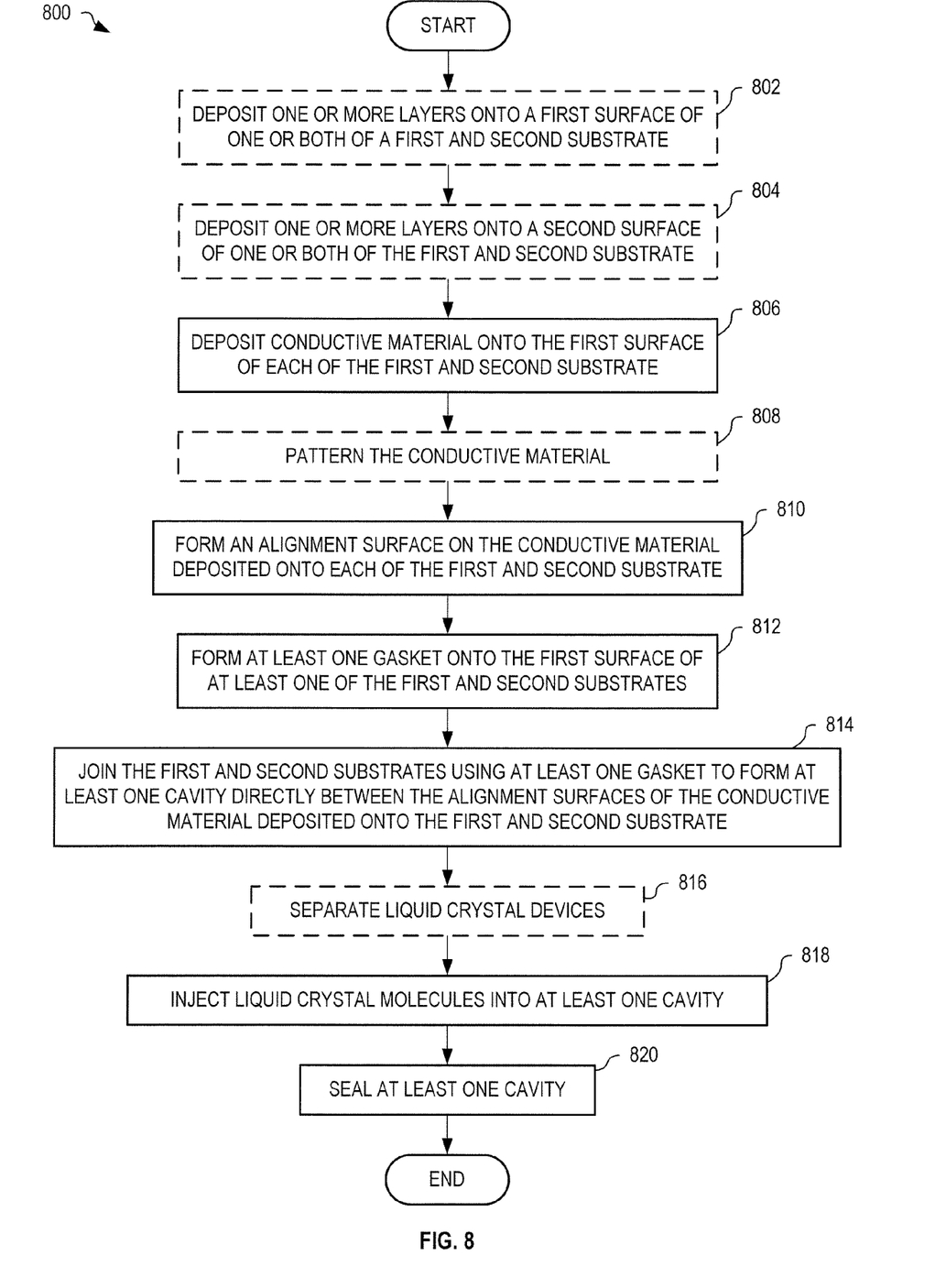
FIG. 8 shows one exemplary process for manufacturing a liquid crystal device with dual-function alignment layers, in an embodiment.

FIG. 8 shows one exemplary process 800 for manufacturing a liquid crystal device (e.g., device 26 FIG. 3, device 50 FIG. 5, device 61, FIG. 6 and device 71, FIG. 7) with dual-function alignment layers (e.g., layers 28 and 29, layers 53 and 54, layers 67 and 68, and layers 74 and 75). Steps 802 and 804 are optional. If included, in step 802, process 800 deposits one or more layers onto a first surface of one or both of a first and second substrate. In one example of step 802, for device 61, FIG. 6, thin film 64 is applied to substrate 62 and thin film 66 is applied to substrate 63 and thin film 65 is then coated onto thin film 66. If included, in step 804, process 800 deposits one or more layers onto a second surface of one or both of the first and second substrates. In one example of step 804, for device 61, thin film 70 is applied to the outer surface of substrate 62 and thin film 69 is deposited onto an outer surface of substrate 63.

In step 806, process 800 deposits conductive material onto the first surface of each of the first and second substrate if step 802 is omitted, or deposits the conductive material onto any layers deposited onto the first surfaces of the first and second substrates in step 802. In one example of step 806, amorphous transparent conductive oxide layers 28 and 29, FIG. 3, are formed on internal surfaces of substrates 27 and 30, respectively.

Step 808 is optional. If included, in step 808, process 800 patterns the deposited conductive material of step 806. In one example of step 806, dual-function layer 53 is patterned using one or more of photolithography, thin film photolithography and etching, or other patterning processes.

In step 810, process 800 forms an alignment surface on the conductive material deposited onto each substrate. In one example of step 810, surfaces of layers 28 and 29 are rubbed to form the alignment surfaces for device 26. In step 812, process 800 forms at least one gasket onto the first surface of at least one of the first and second substrates. In one example of step 812, cell gasket 31 is deposited onto one or both of substrates 27 and 30, and in particular to a surface of one or both of layers 28 and 29. In step 814, process 800 joins the first and second substrates using the gasket to form at least one cavity directly between the alignment surfaces of the conductive material deposited onto the first and second substrate. In one example of step 814, substrates 27 and 30 are positioned substantially parallel by cell gasket 31 to form the cavity for liquid crystal molecules 33.

Step 816 is optional. If included, in step 816, process 800 separates the liquid crystal devices. In one example of step 816, multiple liquid crystal devices, each having at least one gasket and at least one cavity, are separated by scribing and/or sawing to form individual units. U.S. Pat. No. 6,275,277, incorporated herein by reference, shows a plurality of gaskets on a larger, single substrate to create many cells that may then be scribed or cut out after the assembly lamination. The plurality of gaskets may align to predefined architecture or may create the cell boundaries themselves in combination with the cut locations. The dual-alignment layer of the above methods, systems, and devices may thus be utilized to fabricate a plurality of liquid crystal devices.

In step 818, process 800 injects liquid crystal molecules into at least one cavity. In one example of step 818, liquid crystal molecules 33 are injected into the cavity formed by layers 28 and 29 and cell gasket 31. In step 820, process 800 seals at least one cavity to encapsulate the liquid crystal molecules of step 818.

Changes may be made in the above methods, systems and devices without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A dual-function alignment layer of a liquid crystal device, comprising:
   a treated, polyimide-free, amorphous conductive material for direct interface between liquid crystal molecules and a substrate of the liquid crystal device, the conductive material providing both an electric field to the liquid crystal molecules and an alignment surface to which the liquid crystal molecules align.

2. The layer of claim 1, wherein, the alignment surface is formed by rubbing the conductive material.

3. The layer of claim 1, wherein the conductive material is an amorphous Indium Tin Oxide (ITO), a Transparent Conductive Oxide (TCO), transparent, semi-transparent, reflective, amorphous, semi-amorphous, conductive thin film, conductive thin film oxide, amorphous, room temperature or low temperature deposited Indium Tin Oxide (ITO).

4. The layer of claim 1, wherein (a) the substrate is one or more of display grade glass, quartz, fused silica, borosilicate, aluminosilicate, alkali-barium silicate, alkaline earth boroaluminosilicate, sodalime, silicon materials, single crystal (monocrystal), CdSe, and plastic.

5. The layer of claim 1, further comprising one or more additional layers deposited onto a surface of the substrate, wherein the conductive material is deposited onto a surface of the one or more additional layers.

6. The layer of claim 1, further comprising:
   one or more additional layers deposited onto a second substrate of the liquid crystal device; and
   a second conductive material deposited onto a surface of the one or more additional layers.

7. The layer of claim 1, wherein the conductive material is patterned before being treated to form the alignment surface.

8. The layer of claim 1, wherein the liquid crystal device is configured to operate in one of a transmissive configuration, a transflective configuration and a reflective configuration.

9. The layer of claim 1, wherein the liquid crystal device is of one or more of parallel, wedged and non-conformal construction.

10. The layer of claim 1, wherein the liquid crystal device operates in one or more of TN, STN, ECB, Pi, polymer dispersed, stressed polymer dispersed, Ferroelectric, vertical alignment, twisted vertical alignment, in-plane switching, and blue phase modes.

* * * * *